United States Patent [19]

Mayle, Jr.

[11] Patent Number: 4,709,661
[45] Date of Patent: Dec. 1, 1987

[54] WASTE BAG

[76] Inventor: Johnny D. Mayle, Jr., Rte. 2, Box 217, Petersburg, W. Va. 26847

[21] Appl. No.: 847,040
[22] Filed: Jul. 21, 1986
[51] Int. Cl.[4] ................................................ A01K 23/00
[52] U.S. Cl. .................................................. 119/95
[58] Field of Search ............... 119/95, 143; 604/395, 604/329, 328, 322

[56] References Cited

U.S. PATENT DOCUMENTS

| | | |
|---|---|---|
| 900,783 | 10/1908 | Roberts .................................. 119/95 |
| 1,227,261 | 5/1917 | Gurhumann ......................... 119/143 |
| 2,052,598 | 9/1936 | Berg ...................................... 604/395 |
| 2,472,186 | 6/1949 | Arnold ................................... 119/95 |
| 2,519,743 | 8/1950 | Cruise .................................... 119/95 |
| 2,585,251 | 2/1952 | Kahlert ................................. 119/95 |
| 3,090,356 | 5/1963 | Andrisani .............................. 119/95 |
| 3,212,500 | 10/1965 | Bardy .................................... 604/395 |
| 3,661,155 | 5/1972 | Lindan .................................. 604/329 |
| 3,817,217 | 6/1974 | Matuka et al. ........................ 119/95 |
| 4,022,212 | 5/1977 | Lovison ................................ 604/395 |

FOREIGN PATENT DOCUMENTS 559568  7/1958  Canada ................................. 119/95

Primary Examiner—Paul J. Hirsch
Attorney, Agent, or Firm—Epstein & Edell

[57] ABSTRACT

A waste bag for collecting solid waste excretions of a horse includes a bottom cup-like portion and a back portion extending upwardly from the rearward side of the bottom portion. Edges of the back portion are resiliently reinforced so that the back portion conforms to the horse's hips and permits excreted waste to be directed into the bottom portion. A zipper in the bottom portion permits the bag to be selectively emptied without removing the bag from the horse. Drainage holes in the bottom portion automatically drain liquid therefrom. The bag is secured in place by adjustable straps extending from the bag to engage a waistband on the horse.

7 Claims, 4 Drawing Figures

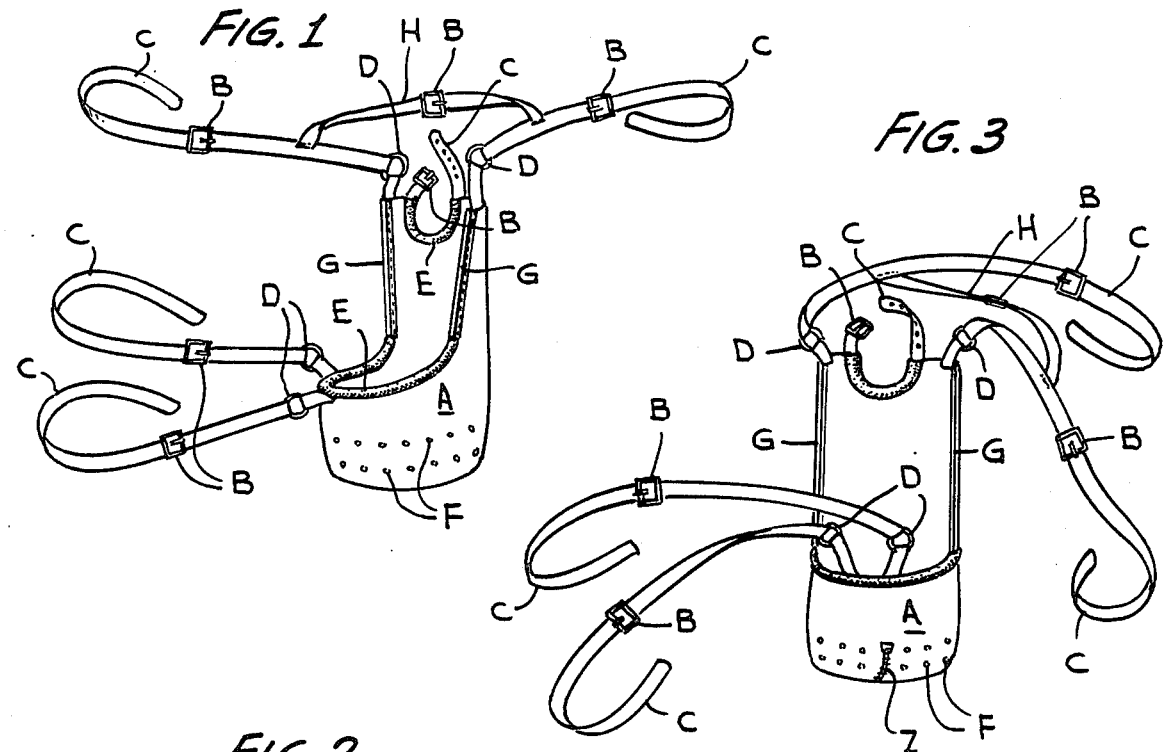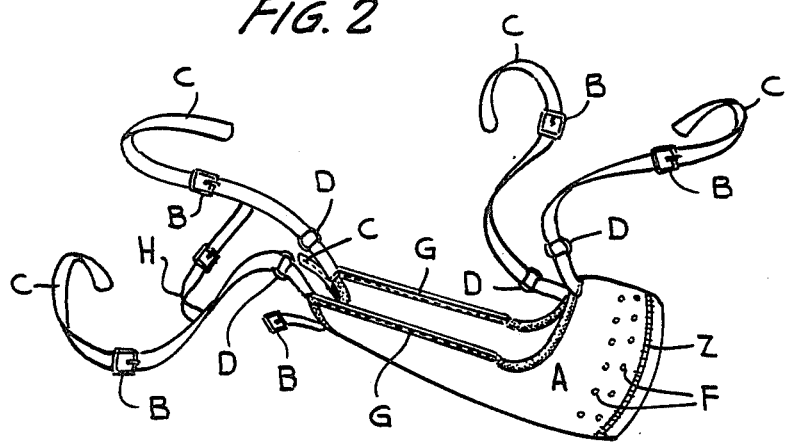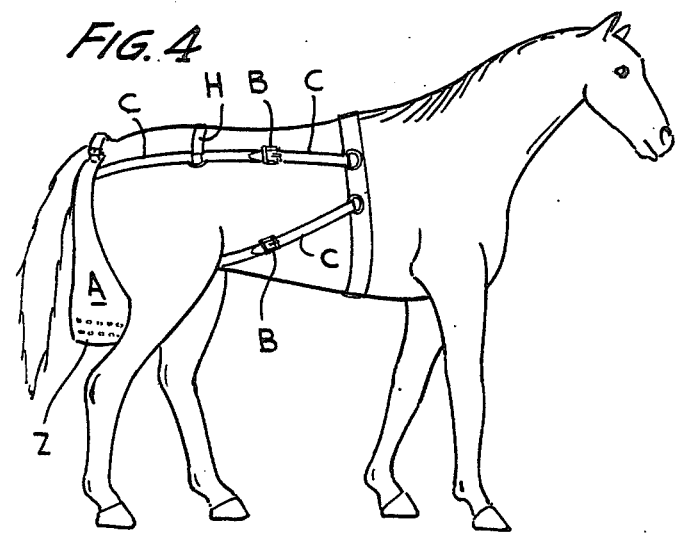

WASTE BAG

BACKGROUND OF THE INVENTION

The present invention relates to waste bags that may be attached to horses for the purpose of collecting solid excreted waste.

OBJECTS AND SUMMARY OF THE INVENTION

It is an object of the present invention to provide an improved waste bag for horses that fits properly, is easy to use and easy to clean.

In accordance with the present invention a waste bag for a horse is made of lightweight washable material and includes a generally cup-like open receptacle portion at its bottom. An elongated back portion extends upwardly from the rearward side of the bottom receptacle portion and terminates in a strap adapted to fit about the horse's tail. The sides of the back portion are reinforced by respective flexible rods sewn into the back portion along its edges and contoured to fit the horse's hips so that the open forward portion of the bag is in position to receive solid waste excretions. The bottom portion is provided with a peripheral zipper to permit the bag to be opened at its bottom in order to remove its contents.

The waste bag is secured in place by means of four straps, namely two top straps extending from the top of the back portion and two bottom straps extending from the top of the bottom portion at the front side of the waste bag. All four straps are secured to a waistband on the horse and are adjustable in length by means of buckles. In addition, a short strap extends between the two upper straps across the horse's back.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference characters in the various figures are utilized to designate like components, and wherein:

FIG. 1 is a view in perspective, looking generally downward of the waste bag of the present invention;

FIG. 2 is another view in perspective of the waste bag showing the bottom portion which may be selectively opened to empty the contents of the bag;

FIG. 3 is a front view in elevation of the waste bag of the present invention;

FIG. 4 is a side view of the waste bag of the present invention secured in place on a horse.

DESCRIPTION OF THE PREFERRED EMBODIMENT

Referring to the drawings in greater detail, the waste bag of the present invention is generally designated by the latter A. The bag includes a bottom portion having a generally cup-like configuration with an open top, the forward portion of which is adapted to extend between the horse's legs and under the horse's belly when the bag is in use. The rearward side of the bottom portion has an integral back portion of the bag extending upwardly therefrom to a location just beneath the horse's tail. In this regard, the upper edge of the back portion of the bag has a recess of generally half-moon shape so that the horse's tail may be passed therethrough. At opposite sides of this recess there are secured a strap C and buckle B which are engaged about the horse's tail to hold the back portion of the bag in place. A strip of sheepskin or other soft material is disposed along the edge of the recess to prevent irritation due to friction at the point where the horse's tail contacts the top edge of the back portion of the bag.

The back portion of the bag has two generally vertically-extending edges which curve smoothly into the lip or upper edge of the bottom cup-like portion of the bag to thereby form a contour which fits the horse's hips. The vertically-extending edges of the back portion are reinforced by flexible rods G that are sewn into the top portion. Rods G may be made of fiberglass, metal, or the like.

The forward side of the lip or upper edge of the bottom portion of the bag is also provided with sheepskin E or similar soft material to avoid irritation to the horse's belly at the point of contact.

In order to attach the waste bag A to the horse, there are four straps attached to the bag and adapted to engage a waistband secured about the horse's mid-section. Two of the straps C extend from the upper edge of the back portion of the bag A on opposite sides of the tail recess. These straps are referred to herein as the top straps. Two bottom straps extend from the forward side of the lip of the bottom cup-like portion of the bag and are also designated by the reference character C. Each strap C includes two length sections joined by a metal ring D permitting relative movement between the two length sections. Each strap C extends through a respective ring on the horse's waistband and then back along its own length to a buckle B which permits the overall length of the strap to be adjustable. The two top straps C extend from the top edge of the back portion of the bag along the back of the horse. A shorter strap H extends over the horse's back between the two top straps to prevent the top straps from slipping along the horse's sides. The two bottom straps extend from the forward side of the bottom portion of the bag, between the horse's legs and along the horse's belly to the waistband.

A zipper Z extends circumferentially about the lower end of the bottom portion of bag A to permit the bottom end to be opened, in the manner of a flap, in order to selectively remove the contents of the waste bag. In addition, a plurality of drainage holes F are defined in the bottom portion of the bag in circumferentially-extending spaced alignment to permit liquid to automatically drain from the bag.

The bag A is preferably made out of Nylon material which is soft and flexible and, importantly, washable. In the preferred embodiment the bag is twenty-five inches long (i.e., from the top edge of the back portion to the bottom of the bag) and fifteen inches wide (i.e., along the top edge of the back portion when the top edge is flattened). The vertical spacing between the forward-most part of the lip or rim of the bottom cup-like portion and the upper edge of the back portion is approximately twelve inches.

The straps are preferably sewn directly onto the bag A. The long pair of upper straps and long pair of lower straps are typically one inch wide and four feet long. Strap H is typically ten inches long and one inch wide.

The drainage holes F are typically sixteen in number and one-quarter in diameter. All of the apparatus, except for the buckles and, possibly, the zipper, are preferably made of Nylon. The waste bag can be fabricated in a number of different sizes to fit different horses; typically, the bag is fabricated in small, medium and large sizes. Because of the soft flexible material from which the bag is made, it may be laid out in a flat configuration when not used. The smooth curve formed by the sides of the back portion merging into the lip or rim of the bottom cup-like portion permits the bag to follow the contour of the horse's hips and fit between the horse's legs. Resilient structural reenforcement is provided by means of the rods G secured to the edges of the back portion of the bag.

The zipper may be made of Nylon or metal and readily facilitates emptying the bag without removing the bag from the horse.

Having described a preferred embodiment of a new and improved waste bag constructed in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

I claim:

1. A waste receptacle for attachment to a horse to collect solid waste excretions, said waste receptacle comprising:

a bag having a bottom portion and a back portion, said bottom portion having a generally cup-like configuration with an open top, said cup-like configuration having a forward side adapted for disposition between the horse's legs and under the horse's belly, and a rearward side, said back portion being integral with said bottom portion and extending generally upward from said rearward side of said bottom portion toward the tail of the horse, said back portion having an upper end and first and second generally vertically-extending edges;

reinforcement means for flexibly reinforcing said first and second edges of said back portion to permit said first and second edges to follow the contour of the horse's hips;

tail engaging means for securing the upper end of said back portion to the horse's tail;

first and second upper strap members secured to said back portions proximate said upper end and adapted to extend along opposite sides of the horse's back to engage a waistband secured about the horse's waist; and third and fourth strap members secured proximate the forward side and open top of said bottom portion and adapted to extend from between the horse's legs along the horse's belly to engage the waistband.

2. The receptacle according to claim 1 further comprising fastener means for selectively opening said bottom portion of said bag to permit the contents thereof to be emptied.

3. The receptacle according to claim 1 further comprising drainage means disposed in said bottom portion of said bag for draining liquid contents from said bag.

4. The receptacle according to claim 3 wherein said drainage means comprises a section of said bottom portion having a plurality of drainage holes defined therein.

5. The receptacle according to claim 3 wherein said reinforcement means comprises first and second rods sewn into said back portion along said first and second edges.

6. The receptacle according to claim 1 further comprising drainage means disposed in said bottom portion of said bag for draining liquid contents from said bag.

7. The receptacle according to claim 1 wherein said reinforcement means comprises first and second rods sewn into said back portion along said first and second edges.

* * * * *